United States

Kiss

[11] 3,840,286
[45] Oct. 8, 1974

[54] ELECTROCHROMIC DEVICE

[75] Inventor: Zoltan Joseph Kiss, Belle Mead, N.J.

[73] Assignee: Optel Corporation, Princeton, N.J.

[22] Filed: July 30, 1973

[21] Appl. No.: 384,051

[52] U.S. Cl. .............................. 350/160 R
[51] Int. Cl. ............................. G02f 1/36
[58] Field of Search ................... 350/160 R

[56] References Cited
UNITED STATES PATENTS
3,521,941   7/1970   Deb et al. .............. 350/160 R

*Primary Examiner*—Vincent P. McGraw
*Attorney, Agent, or Firm*—Joel F. Spivak

[57] ABSTRACT

An electrooptic device comprises adjacent solid state layers, one layer including an oxidizable ion and the second layer includes a reducible ion therein such that upon injection of holes into said layer including oxidizable ions and electrons into said layer including reducible ions, the ions are respectively oxidized and reduced causing a change in the color state of at least one of said layers so as to cause a change in color of said electrochromic device. The device includes means for injecting holes and electrons into said layers.

13 Claims, 1 Drawing Figure

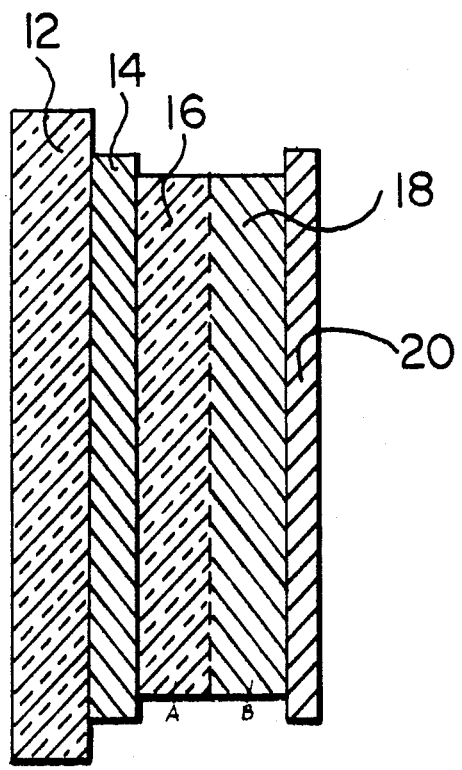

ELECTROCHROMIC DEVICE

BACKGROUND OF INVENTION

This invention relates to electrooptical devices and more particularly to devices wherein the electromagentic transmission characteristics may be reversible altered by a suitably controlled electric field. These devices are commonly termed electrochromic device.

One purpose of the present invention is to provide an all solid state display which can be altered from a first absorption state to a second absorption state by an electric current in one direction and return to said first state by applying a current in the opposite direction. A device which can be changed from a colored appearance to white and vice versa or from one color to another color is an example of the operation of the novel device.

U.S. Pat. No. 3,521,941 issued to S. K. Deb et al. and assigned to American Cyanamid Company also relates to an all solid state electrochromic display device. Deb et al. discloses an early version of a solid state display which incorporates a single, uniform, electrochromic material sandwiched between electrodes and which changes its electromagentic radiation transmitting properties (color) under the impulse of an electric field. The contribution made by Deb et al. to this prior art device is stated to be the addition of a layer between one of the electrodes and the electrochromic material. Deb et al. characterizes this additional layer as a current carrier permeable insulator. This insulator according to Deb may be an air gap, a vacuum, plastics as well as metal oxides or sulfides, fluoride and carbide films. The present invention, neither relies upon a single uniform elctrochromic material nor does it employ a current carrier permeable insulator as disclosed in Deb.

SUMMARY OF THE INVENTION

An electrochromic device comprising a sandwich structure including a first layer of a solid material and a second layer of a solid material, said first layer containing ions whose valence state can be oxidized by hole injection and said second layer containing ions whose valence state can be reduced and further characterized in that the change of valence state of at least one of said ions causes a change in the electromagnetic absorption spectra of the layer with which said ions are associated, said layers being sandwiched between electrodes.

The invention also includes a method of operating an electrochromic device including the steps of simultaneously injecting electrons and holes into adjacent layers of said device for causing a change in valence state of ionic impurities in said layers thereby causing a change in color of the device and then changing the electrode polarity as to inject electrons and holes into said layers such that electrodes are injected into the layer into which holes had formerly been injected and holes are injected into the layer into which electrons were formerly injected for causing said ions to return to their original valence state thereby causing the device to return to its original color state.

BRIEF DESCRIPTION OF THE DRAWING

The sole FIGURE is a cross-sectional view of a simple embodiment of the invention.

DETAILED DESCRIPTION OF THE INVENTION

The novel device which is suitable for example for use as an alphanumeric display device, is shown with reference to the FIGURE and comprises in a sandwich type or layered structure a support plate 12 at first electrode 14 on said support plate, a first solid state layer 16 containing reducible ions therein, a second solid state layer 18 containing oxidizable ions therein adjacent to said first solid state layer 16 and a second electrode 20 adjacent said second solid state layer 18. It should be understood that the first solid state layer could contain the oxidizable ions and the second solid state layer could contain the reducible ions and the device would work equally as well.

If one were to use such a device as an alphanumeric display at least one of the electrodes 14 or 20 would be patterned and segmented as is well known in the art to form such a display.

The device may either operate in a transmissive mode or a reflective mode depending upon the nature of the electrodes and the thickness of the solid state layers. For example, when operating in the transmissive mode, the support plate 12 as well as the electrodes 14 and 20 must all be light transmitting. Likewise, the solid state layers must be of a thickness, for example, less than one micron for such that light can pass therethrough. If the device is to operate in a reflective mode, one of the electrodes preferably the unpatterned electrode is of a reflective material while the other electrode is light transmitting. A third mode of operation is the absorptive mode wherein essentially all of the light is initially either reflected or absorbed by one of the solid state layers and the changes in the absorption characteristic of at least on of these layers is observable through transparent electrodes.

Typically, the support plate and electrode adjacent thereto can be glass having a conductive tin oxide or indium oxide coating thereon. Such materials are commercially available and known as Nesa glass. The top electrode can likewise be formed of conductive tin oxide or indiumoxide films or other conductive transparent films known in the art. Aluminum thin films are suitable as electrodes for operating of the device in its reflective mode or for what would be the back electrode if the device operated in an absorptive mode.

Each solid state layer contains ions whose valence state can be altered. Furthermore, at least one of said solid state layers has the characteristic that while the ions in one valence state cause that layer to have a first transmission characteristic (thereby causing that layer to exhibit a first color), when in another valence state, the transmission spectra is changed such that the color of that layer is changed. The two layers can consist of entirely different solid state materials or can consist of the same host material with each layer being doped with different ions, one layer being doped with oxidizable ions while the other layer being doped with reducible ions. The layers can be formed separately or may consist of a single, thin, solid material having the necessary different ions diffused therein from opposite surfaces.

The novel device is operated by injecting electrons into that layer having the reducible ions while simultaneously injecting holes into that layer having the oxidizable ions thereby respectively reducing and oxizing the respective ions. It is believed that to obtain charge compensation in the new valence states, charged ions or vacancies migrate from one layer to the other. Upon injection of electrons and holes as aforesaid, a presistent color change is obtained.

The color change which results from the combination of electron and hole injection and ionic or vacancy migration may be due to any of three possible causes:

1. Oxidation and reduction of ions in the two layers at least one of the resulting species being colored.
2. Color centers formed by the migration of the ions.
3. A combination of (1) and (2). For example, a color center complex consisting of ions of the layers whose valence charge is stabilized by the migrated ions or vacancies.

When the electrode polarity is reversed, electrons and holes are extracted or otherwise balanced such that the ions return to their original valence states and the device returns to its original color. Once the ions are in their original configuration, additional injection stops since the resistance of the device increases greatly. In addition, the forward or reverse processes can be stopped at any time prior to saturation to obtain a continuous gray scale.

While it is understood that each layer can change from one color to another color or from a colored state to an uncolored state, that is, that the device is operative upon the change of the elctromagnetic radiation absorption characteristics of at least one of the layers, for clarity we shall talk of a colored and uncolored state. The electro-chemistry of the device can be depicted as follows:

$A^{n+} \rightarrow A^{n+1}$ $B^{M+} \rightarrow B^{m-1}$ $A^{n+}$ and $B^{m+}$ represents stable uncolored states of the ions and hence when the ions are in this state the respective layer associated with each of these ions is uncolored. At least one of the states, $A^{(n+1)}$ or $B^{(m-1)}$ represents a colored state formed by virtue of one of the aforementioned causes, the layer associated with such a color state takes on that color. Upon electron injection into the layer $B^{m+}$ and hole injection into the layer $A^{n+}$ these layers respectively take on the velnce state $B^{(m-1)}$ and $A^{(n+1)}$ and hence the devide goes from an uncolored condition to a colored condition. Upon reversal of polarity, the color condition returns toward the uncolored condition as the ions return to the $A^{n+}$ and $B^{m+}$ valence states.

An example of a suitable ion pair useful in novel device is where $A^{n+}$ is $Fe^{+3}$ and $B^{m+}$ is $W^{6+}$. In such a combination the $6^+$ tungsten, upon electron injection, is reduced to $W^{5+}$ and the layer associated therewith goes from a colorless to a colored state. The iron ($Fe^{+3}$) is converted to $Fe^{+4}$ upon hole injection and the layer associated therewith goes from an essentially colorless to a colored state. Hence, the device will change color from essentially colorless to colored. In order that the layer containing the $Fe^{+3}$ ions be essentially colorless, this layer should be less than one micron in thickness and contain less than about $10^{19}$ iron ions per cubic centimeter. The host material for the layers can be any solid state material into which the ions can diffuse and which will not itself react with any of the ions. Preferably, the host material is not itself colored. A useful host material is aluminum oxide. Other suitable ions for use in such device include, typically, the transition metal ions and the rare earth ions which typically exhibit more than one valence state. It is understood that the layers containing the oxidizable or reducible ions need not be in the form of a host material containing such ions but may be compounds which include the ions themselves. For example, the tungsten containing layer may be a layer of tungsten oxide and the iron containing layer may be a layer of iron oxide.

What I claim is:

1. An electrochromic device comprising a sandwich structure including a first and second solid state layer said first layer containing ions whose valence state is oxidizable and said second layer containing ions whose valence state is reducible and further characterized in that the change of valence state of at least one of said ions causes a change in the electromagnetic absorption spectra of the layer with which said ions are associated, said layers being sandwiched between electrodes.

2. The device recited in claim 1 including a support plate over which one of said electrodes are formed and wherein one of said electrodes is patterned.

3. The device recited in claim 1 wherein said transparent support plate, said electrodes and said solid state layers are all essentially light transmitting.

4. The device recited in claim 2 wherein at least one of said electrodes is reflective.

5. The device recited in claim 2 wherein light is essentially completely absorbed by at least one of said solid state layers in at least one of its colored states.

6. The device recited in claim 1 wherein said first layer contains trivalent iron and said second layer contains hexavalent tungsten ions.

7. The device recited in claim 6 wherein said iron and tungsten ions are present in a host material.

8. The device recited in claim 7 wherein said host material is aluminum oxied.

9. The device recited in claim 6 wherein at least one of said iron and tungsten ions are in the form of their respective oxides.

10. The device recited in claim 6 wherein said iron ions are contained in an aluminum oxide host and wherein said tungsten ions are in the form of a tungsten oxide layer.

11. The device recited in claim 2 wherein said solid state layers are less than one micron in thickness.

12. The method of operating an electrochromic device including the steps of simultaneously injecting electrons and holes into adjacent layers of said device for causing a change in valence states of ionic constituents in said layers thereby causing a change in color of said device followed by the step of changing the electrode polarity across said layers causing said ions to return to their original valence states thereby causing the device to return to its original color.

13. The method of operating an electrochromic device as recited in claim 11 including the step of causing ions to migrate from one adjacent layer to the other of said adjacent layers so as to cause charge compensation within said layers.

* * * * *